March 18, 1930.  J. F. RULE  1,750,967
MEANS FOR AUTOMATICALLY CONTROLLING THE TEMPERATURE OF MOLTEN GLASS
Original Filed April 12, 1927  3 Sheets-Sheet 1
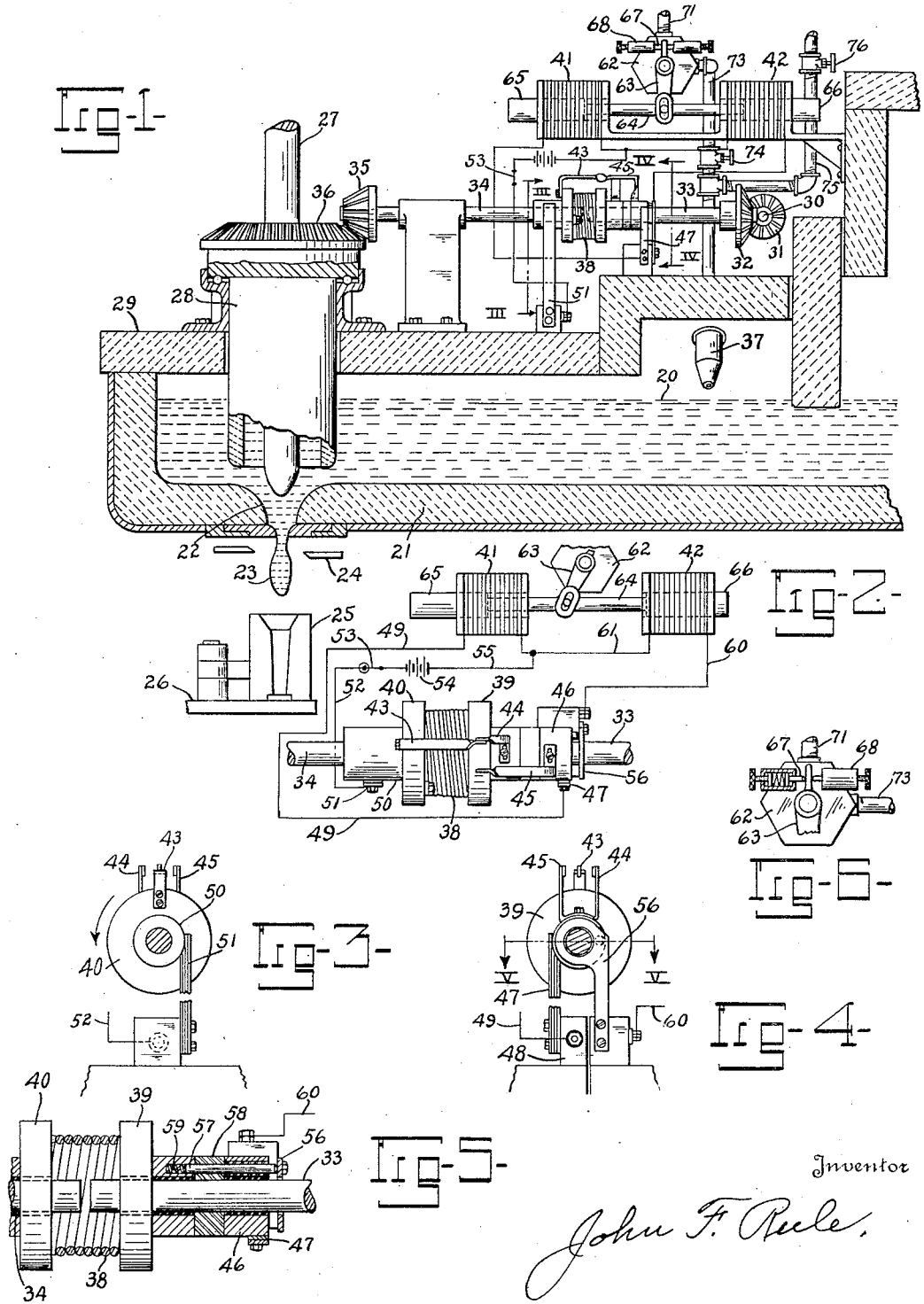
Inventor
John F. Rule,

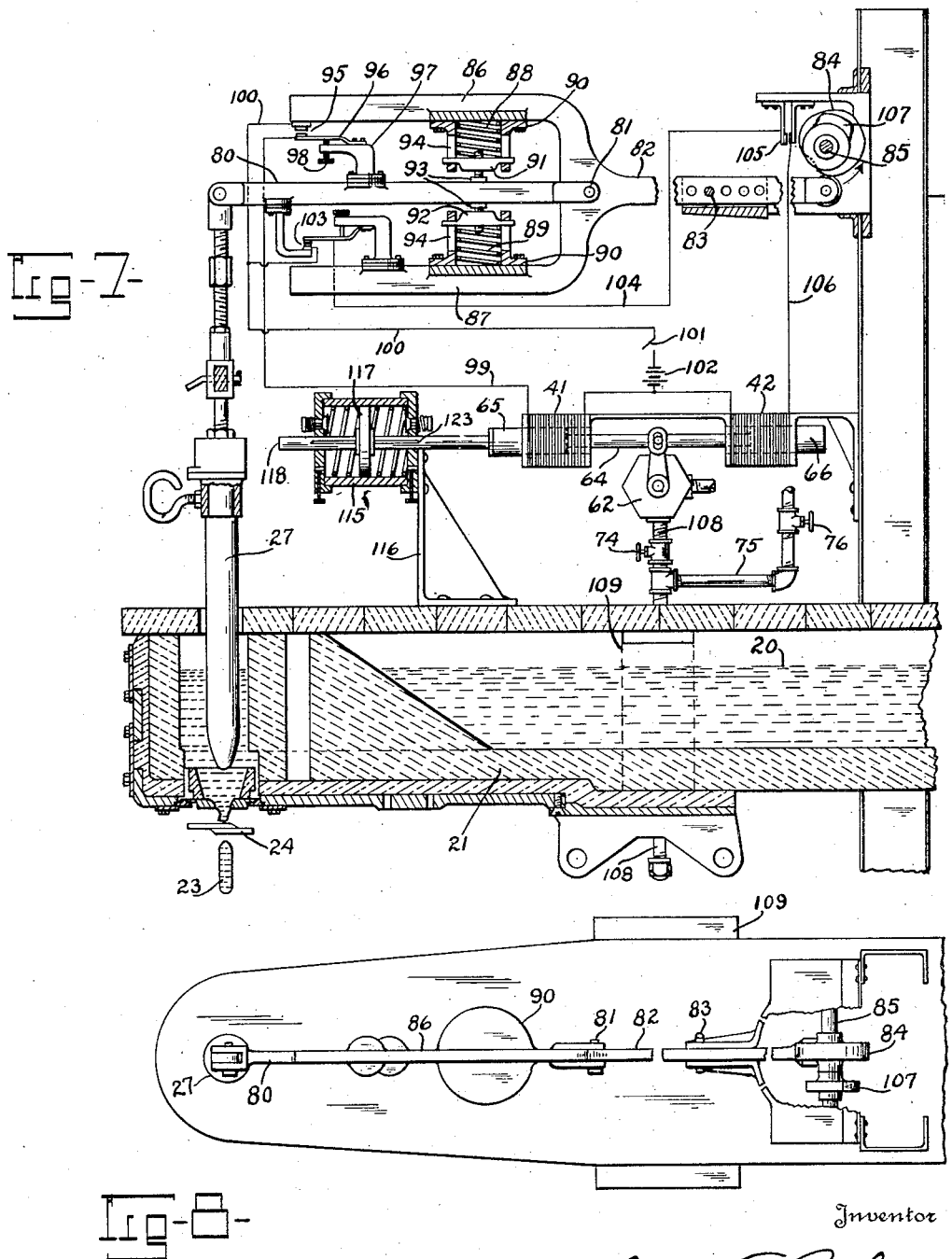

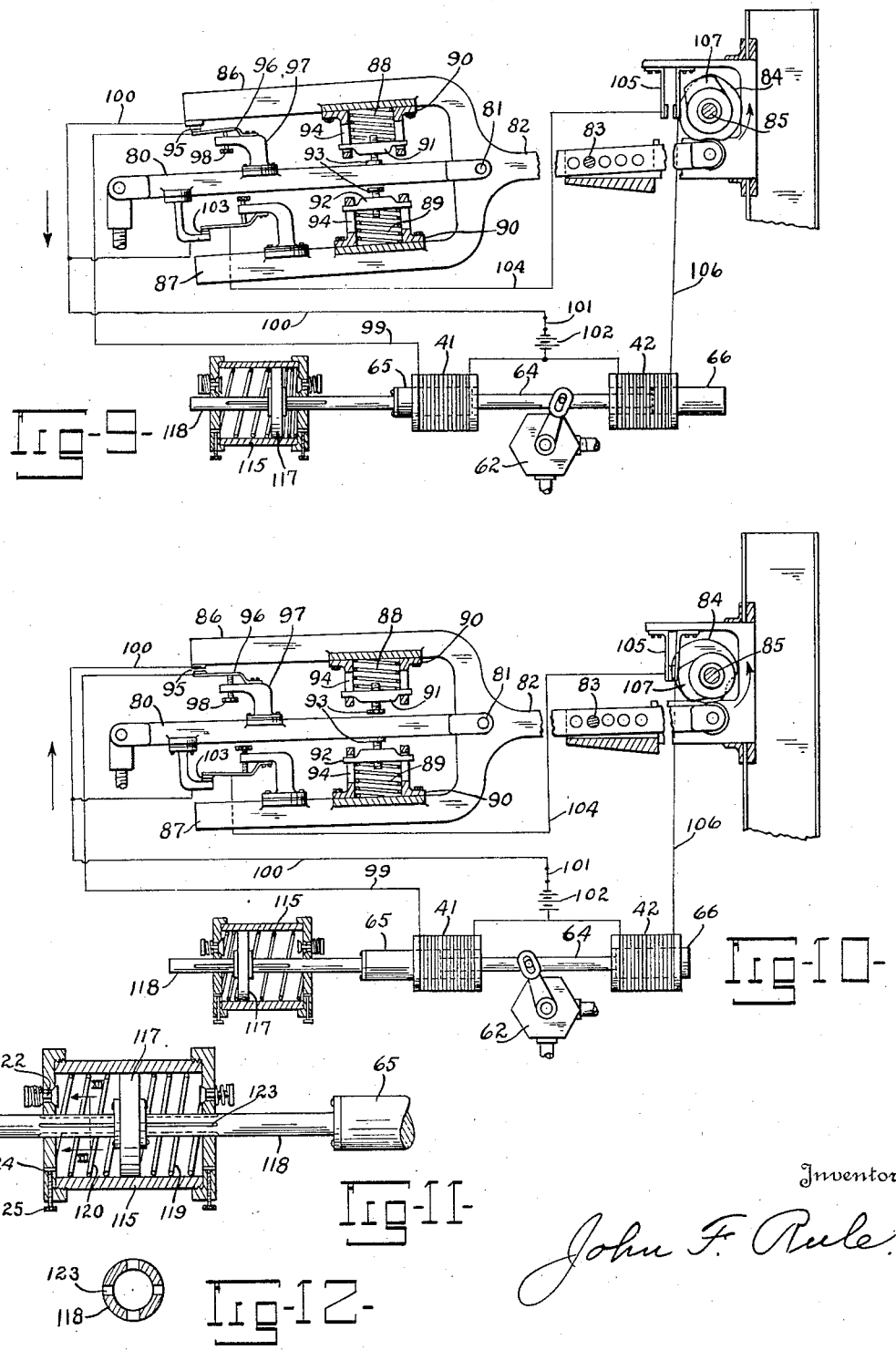

Patented Mar. 18, 1930

1,750,967

UNITED STATES PATENT OFFICE

JOHN F. RULE, OF TOLEDO, OHIO, ASSIGNOR TO OWENS-ILLINOIS GLASS COMPANY, OF TOLEDO, OHIO, A CORPORATION OF OHIO

MEANS FOR AUTOMATICALLY CONTROLLING THE TEMPERATURE OF MOLTEN GLASS

Application filed April 12, 1927, Serial No. 183,067. Renewed September 8, 1928.

My invention relates to a method and apparatus adapted for the automatic regulation and control of the temperature of molten glass and as herein disclosed is particularly adapted for use with apparatus for delivering charges of molten glass to the molds of a forming machine.

In the practical operation of mechanism for forming and delivering charges of glass to molds, considerable difficulty is experienced on account of variations in the temperature and fluidity of the glass, resulting in variations in the size and shape of the charges delivered to the mold, as well as lack of uniformity of temperature conditions. These variations and inequalities result in defects and lack of uniformity in the finished ware.

The temperature of the glass is ordinarily regulated by the operator, who observes the condition of the issuing glass and adjusts the temperature control valves or other temperature regulating means accordingly. This method, however, is unreliable and does not permit the temperature conditions to be maintained as uniform as desired.

An object of the present invention is to overcome the difficulties and defects incident to the present methods of temperature control by hand, by providing practical means for automatically maintaining an accurate temperature regulation. Small variations in the temperature of glass in the condition in which it is delivered to the molds, result in substantial variations in the fluidity or viscosity of the glass. This feature is utilized in the present invention to effect an automatic control by means of the resistance offered by the glass to an implement or device moving in the glass. Thus, for example, any decrease below the normal working temperature of the glass will materially increase its viscosity and therefore increase the resistance offered to the movement of the implement therein.
This increased resistance acts through suitable means to control a temperature regulating medium in a manner to apply more heat to the glass and thereby restore it to normal temperature. In like manner, an increase in the temperature of the glass above normal, by reducing the resistance of the glass to the movement of the regulating implement therein, reacts through suitable controlling mechanism to effect a cooling of the glass.

A further object of the invention is to utilize in the automatic temperature control of the glass, an implement or mechanical device working in the glass and forming a part of the usual apparatus for regulating or controlling the issuance of glass in apparatus for delivering charges to molds. For this purpose, I may utilize, for example, the tubular member which is frequently employed in glass feeding apparatus and is rotated in the glass for the purpose of stirring the glass, and which in some instances also serves to control the rate of flow. In one of its forms the present invention also contemplates the utilization, for glass temperature control, of the usual reciprocating plunger by which the flow of glass is periodically controlled.

A further object of the invention is the provision of means by which the size or weight of the charges of glass delivered by a glass feeding mechanism to the molds of a forming machine, may automatically be kept uniform independently of variations in the speed of the forming machine. For this purpose there is provided means by which an increase, for example, in the speed of the forming machine, which would otherwise result in a decrease in the size of the charges, operates through suitable mechanism to increase the temperature and rate of flow of the glass in a manner to maintain a normal and substantially uniform size and weight of the charges.

Other objects of the invention will appear hereinafter.

In the accompanying drawings:

Figure 1 is a sectional elevation of a glass feeding apparatus to which the present invention is applied.

Figure 2 is a partly diagrammtic view showing the electrical controlling circuits and the electromagnets.

Figure 3 is a sectional elevation at the line III—III on Figure 1.

Figure 4 is a sectional elevation at the line IV—IV on Figure 1.

Figure 5 is a sectional plan at the line V—V on Figure 4.

Figure 6 is a detail view showing valve operating mechanism.

Figures 7 to 12 illustrate a modified form of construction in which the reciprocating plunger is used to control the electrical circuits.

Figure 7 is a sectional elevation of the apparatus, parts being broken away.

Figure 8 is a plan view of the same.

Figure 9 is a view showing the relation of parts during a down stroke of the plunger when the glass is below normal working temperature.

Figure 10 is a view showing the relation of parts during the up stroke of the plunger when the glass is above normal temperature.

Figure 11 is a sectional view of the dash pot.

Figure 12 is a section at the line XII—XII on Figure 11.

Referring particularly to Figure 1, the molten glass 20 is continuously supplied from the main furnace or tank into the forehearth or boot extension 21 and issues through an outlet 22 in the floor of the boot. The issuing glass forms suspended masses or gobs 23 of appropriate size and shape to form mold charges which are periodically severed by cutters 24 and drop into the molds 25 on the rotating mold carriage 26 of the forming machine. The mechanism for actuating the cutters 24 is preferably driven from or geared to the mold carriage to operate in synchronism therewith in the usual manner. The flow of glass through the outlet may be controlled in the usual manner by a plunger 27 which is periodically reciprocated vertically in timed relation to the operations of the cutters.

A tube or sleeve 28 of refractory material surrounds the plunger and projects downward through an opening in the cover block 29 of the boot into the glass. This tube is preferably adjustable vertically to regulate the size of the space between the lower end of the tube and the floor of the boot and thereby regulate the rate of flow of the glass. For this purpose any suitable adjusting mechanism may be employed, as for example, that disclosed in the U. S. patent to Soubier, Number 1,642,904, September 20, 1927.

The tube 28 is rotated continuously about the vertical axis of the plunger 27. The means for rotating the tube comprises a drive shaft 30 from which power is transmitted through gears 31, 32, aligned shafts 33 and 34, and gears 35 and 36. A burner 37 projecting into the space above the glass in the boot, supplies heat for maintaining the glass at a suitable working temperature. The amount of heat thus applied is automatically regulated by the mechanism which will now be described.

The aligned shafts 33 and 34 through which driving power is transmitted to the rotating sleeve 28 are connected through a torsion spring 38, the ends of which are secured to disks 39 and 40, respectively secured to but electrically insulated from the shafts 33 and 34. This spring connection permits a limited relative rotation of the two shafts. The relative rotative position of the shafts is determined by the resistance which the tube 28 offers to the rotation of the shaft 34, which resistance is in turn dependent on the viscosity of the glass and varies with any variations in the temperature of the glass. The relative position of the shafts 33 and 34 determines the condition of the electrical circuits for electro-motors, herein shown as electro-magnets 41 and 42 which actuate suitable valve mechanism, as hereinafter described, to regulate the supply of fuel gas to the burner 37. Included in the electrical circuits is a contact arm 43 mounted on the disk 40 and movable between contacts 44 and 45 mounted to rotate with the disk 39. The contact arm 45 is carried on a metal sleeve 46 mounted on but insulated from the shaft 33. A brush contact 47 carried by a stationary block 48, bears against the rotating sleeve 46. When the arms 43 and 45 are in engagement, as hereinafter explained, a circuit is established for the electro-magnet 41. This circuit may be traced from the electro-magnet coil through conductor 49, brush 47, sleeve 46, arms 45 and 43, disk 40, hub 50 of disk 40, brush 51, conductor 52 (including switch 53), battery 54 and conductor 55 to the opposite terminal of the electro-magnet coil.

The circuit for the electro-magnet 42 includes a stationary contact plate 56 forming a wiper against which bears a conducting rod 57 mounted to rotate with the shaft 33. Said rod is mounted for lengthwise movement in aligned openings formed in the hub of the disk 39, an insulating disk 58 and sleeve 46 and is held against the contact plate 56 by a spring 59. The rod 57 is insulated from the disk 46. A circuit for the electro-magnet 42 may be traced from one terminal thereof through conductor 60, contact plate 56, rod 57, arms 44 and 43, disk 40, brush 51, conductor 52, battery 54 and conductors 55 and 61 to the opposite terminal of the electro-magnet.

The electro-magnets 41 and 42 control a valve 62 in the fuel line of the burner 37. Said valve comprises an arm 63 connected to a rod 64 which carries the cores 65 and 66 of the electro-magnets 41 and 42, respectively. When the magnets are both deenergized, the arm 63 is held in an intermediate position (see Figs. 1 and 6) by means of spring actuated rods 67 mounted in casings 68. The fuel line for the burner comprises a pipe 71, valve 62 and a pipe 73 extending to the burner. A hand valve 74 may be provided for cutting off the flow of fuel gas supplied through the automatic valve 62. A branch pipe 75 permits fuel gas to be supplied to the burner independently of the automatic mechanism. The pipe 75 is normally closed by a hand valve 76 when the automatic fuel control mechanism is in operation.

The operation of the apparatus shown in Figures 1 to 5 may be described as follows.

Assuming the glass to be at the normal temperature required for producing mold charges, the plunger 27 reciprocating periodically and the tube 28 being rotated continuously by power transmitted from the shaft 30, the torsion spring 38 will be under a certain tension owing to the resistance offered by the glass to the rotation of the tube 28. This tension is such that the disk 40 is rotated relative to the disk 39 to an intermediate position in which the contact arm 43 is about midway between the arms 44 and 45, so that the circuits for both electro-magnets are open. The valve 62 is, therefore, held in its intermediate position (Fig. 1) in which the flow of fuel gas to the burner 37 is restricted but not entirely cut off. The burner 37 will, therefore, supply enough heat to keep the glass at about normal temperature. If conditions change so that the glass becomes too hot, less resistance will be offered to the rotation of the tube 28, thereby reducing the tension on the spring 38 so that the disk 40 moves relative to the disk 39, to the Figure 2 position in which the arms 43 and 44 are brought into engagement. This completes the circuit for the electro-magnet 42 which is thereby energized and operates to swing the valve to the Figure 2 position. This further restricts or cuts off entirely the fuel supply to the burner 37 so that the glass cools down to a normal temperature, increasing its viscosity so that the increased resistance offered to the rotation of the tube 28 again results in a separation of the contacts 43 and 44. The circuit for the electro-magnet being thus opened, the valve is returned to its normal intermediate position and the fuel supply thereby increased to normal.

If the glass should become too cold, the viscosity is increased so that a greater tension is applied to the torsion spring 38 and the arm 43 is moved into engagement with the arm 45, thereby establishing a circuit for the electro-magnet 41. This electro-magnet then draws its armature 65 inward, swinging the valve arm 63 to the right and moving the valve 62 to a wide open position, thus increasing the supply of fuel to the burner 37. The increased heat restores the glass to normal temperature and viscosity so that the resistance to the rotation of the tube is reduced and the contacts 43 and 45 separated, deenergizing the magnet 42 and permitting the valve to be restored to its normal intermediate position.

The automatic temperature control apparatus above described may be utilized to maintain a substantially constant weight of the charges when the speed of the forming machine varies and when such variation in speed would otherwise result in a corresponding variation in the weight of the charges. For example, if the speed of the forming machine were increased, the shears 24 would operate at shorter intervals so that other things being equal the size of the charges would be reduced. But as the shaft 30 which drives the tube 28, is driven by the forming machine or at a speed proportional to that of the mold carriage, any increase in the speed of the latter correspondingly increases the speed of the tube 28. This increased speed increases the torque or tension on the spring 38 so that the contacts 43 and 45 are brought together in the same manner as above explained in connection with an excessive cooling of the glass. This results in the application of more heat to the glass, thus increasing its fluidity and correspondingly increasing the rate of flow through the outlet 22. The size or weight of the charges 23 is thus increased sufficiently to compensate for the reduction in the time intervals between the successive operations of the cutters, whereby the size of the charges remains substantially constant.

Although the automatic temperature control, as above described, is effected by varying the supply of fuel gas to the burner 37, it is to be understood that the pipe line 73 might convey a cooling medium which would be automatically regulated by operation of the valve 62 to control the temperature. In this instance, any decrease below normal in the temperature of the glass would serve to close instead of open the valve, thereby decreasing the supply of cooling medium and vice versa. Also, the electro-magnets might readily be arranged to operate independent valves, one for controlling the supply of fuel gas or a heating medium and the other a cooling medium.

In Figures 7 to 12, inclusive, I have illustrated a modified construction for controlling the supply of a cooling medium to the glass and thereby automatically regulating its temperature. In this form of the invention, the electro-magnet circuits are controlled through the resistance offered by the glass to the reciprocating movements therein of the plunger 27. The plunger is pivotally connected to the outer end of a control arm 80 having a pivotal connection 81 at its inner end to the plunger operating lever 82 fulcrumed at 83. The lever 82 is actuated by a continuously rotating cam 84 on a drive shaft 85. The forward portion of the plunger operating lever 82 is bifurcated or forked to form parallel arms 86 and 87 between which is located the arm 80. The latter is held in an intermediate position between the arms 86 and 87 by compression springs 88 and 89 mounted in casings 90 on the arms 86 and 87. The springs 88 and 89 bear, respectively, against yokes 91 and 92 which are movable up and down in said casings. Stops 93 adjustable in said yokes bear against the upper and lower sides, respectively, of the arm 80. These stops may be adjusted as shown to contact with the arm 80 when the yokes 91 and 92 are at their outer limits of movement in guideways 94 formed in the casings 90.

The control arm 80 is movable up and down relative to the arms 86, 87, under conditions hereinafter set forth, to control circuits for the electromagnets 41 and 42. When the arm 80 swings upward relative to the lever 82, a pair of contacts 95 are brought together, said contacts being carried respectively by the arm 86 and a spring arm 96 on a bracket 97 carried by the arm 80. An adjusting screw 98 serves to adjust the contact arm 96. A circuit for the electro-magnet 41 may be traced from the magnet coil through a conductor 99, contacts 95, conductor 100, switch 101 and battery 102 back to the magnet coil. A pair of contacts 103 are carried, respectively, by the arms 80 and 87, said contacts being in circuit with the electro-magnet 42. The circuit for said electro-magnet may be traced from the magnet winding through battery 102, switch 101, conductor 100, contacts 103, conductor 104, contacts of switch 105 and conductor 106 back to the magnet coil. The contacts of switch 105 are momentarily brought together once during each complete reciprocation of the plunger. This closing of the switch is effected by a cam 107 carried on the cam shaft 85 and so positioned that it engages and closes the switch as the plunger 27 is moving upward. The purpose of this switch 105 will be described later.

The operation of the apparatus shown in Figures 7 to 12 will be understood from the following description:

Figure 7 shows the parts in the position they would normally assume with the feeder at rest. The arm 80 is held in an intermediate position, the contacts 95 being separated and the contacts 103 held together. The electro-magnet 41 is brought into operation when the temperature of the glass is below normal, and the electro-magnet 42 is brought into operation when the temperature rises above normal. Considering, first, the operation of the electro-magnet 41. As the plunger moves downward, the glass offers a certain resistance to such movement. This tends to swing the arm 80 upward about its pivot and compress the spring 88 to an extent determined by the resistance of the glass. If the temperature of the glass is normal, the upward movement of the arm 80 about its pivot will be insufficient to bring the contacts 95 together. The electro-magnet 41 will therefore remain inactive. If, however, the temperature of the glass has fallen below normal, its viscosity is materially increased so that it offers a greater resistance to the downward movement of the plunger. This resistance reacts through the arm 80 to compress the spring 88 to a greater extent and brings the contacts 95 together to complete the circuit for the electro-magnet 41. This condition is shown in Figure 9. The magnet 41 being thus excited, operates the valve 62.

The valve in this instance is arranged in an air line 108 by which cooling air is conveyed to an air channel 109 surrounding the furnace boot 21. This air cooling system, except as to the automatic control features herein set forth and claimed, may be the same as fully disclosed, for example, in the patent to Cramer, Number 1,618,271, February 22, 1927. When the valve 62 is moved to the Figure 9 position as above described, the air supply is cut off or reduced so that there is a corresponding reduction in the amount of cooling of the glass which takes place in the boot 21. The temperature of the glass is accordingly permitted to rise to normal. It will be noted that the contacts 95 can only be brought together during the down stroke of the plunger and then only when the glass is too cold. The electro-magnet, therefore, remains energized only for a short interval.

In order to effect a slow return movement of the electro-magnet core 65 when the magnet is deenergized, there is provided a dash pot 115 mounted on a bracket 116. This dash pot (see Fig. 11) comprises a piston 117 and a piston rod 118 attached to the magnet core 65. The piston is held in its intermediate position by coil springs 119 and 120. When the electro-magnet 41 is energized and moves the parts to the Figure 9 position, air is freely admitted behind the piston 117 through a poppet valve 122. The air in front of the piston is permitted to escape quickly through slots or air passages 123 formed in the hollow piston rod 118 and extending lengthwise thereof. It will be noted that these slots 123 extend just beyond the end walls of the dash pot when the piston is in its central position. They thus permit a quick escape of the air in advance of the piston as the latter moves in either direction beyond central position.

When the electro-magnet 41 is deenergized, the dash pot functions to cause a slow return of the parts. The air in advance of the piston is trapped during this return movement and only permitted to escape slowly through a bleed opening 124, the size of which is adjusted by a needle valve 125. It will be observed that during this return movement, the one way valve 122 is held in closed position and the slots 123 in the piston rod are in such position that the air cannot escape there-through. Owing to this dash pot action, the valve 62 will remain closed until the temperature of the glass has been restored to normal. That is to say, although the magnet circuit is opened at the contacts 95 during the down strokes of the plunger, the time intervals between succeeding energizations of the magnet are insufficient to permit a return of the valve to open position. The air supply controlled by said valve thus remains cut off till the temperature of the glass rises to normal so that the contacts 95 remain separated.

The operation when the temperature of the glass rises above normal will now be described: The electro-magnet 42 then controls the temperature reduction. During the down stroke of the plunger, the resistance of the glass will tend to swing the arm 80 upward about its pivot relative to the arm 87, thereby compressing the spring 88, but the contacts 103 remain together. The circuit thus remains unbroken at the contacts 103 during the down stroke of the plunger regardless of glass conditions, but is always open during the down stroke at the contacts 105. During the up stroke of the plunger, the glass exerts a downward pull, thus compressing the spring 89 to a greater or less extent, depending on the condition of the glass. If the temperature of the glass is normal, the movement of the arm 80 relative to the arm 87 will be sufficient to separate the contacts 103. The circuit for the electro-magnet 42 is, therefore, open at the contacts 103 while the cam 107 closes the switch 105 momentarily during the upward stroke of the plunger. It will thus be seen that with the glass temperature either normal or below normal, the circuit for the magnet 42 is at all times open either at the contacts 103 or 105, or at both points.

If the glass becomes too hot, its fluent condition is such that it will offer comparatively little resistance to the upward movement of the plunger. As a consequence, during the up stroke the contacts 103 will not be separated. Therefore, when the cam 107 closes the circuit at contacts 105, the electro-magnet 42 is energized and operates the valve 62 to a wide open position. The parts are now in the Figure 10 position. The amount of cooling air supplied through the line 108 is thus increased so that the temperature of the glass is reduced to normal. The dash pot 115 cooperates with the electro-magnet 42 in the same manner as already described in connection with the electro-magnet 41, for maintaining the valve 62 in its open position until the temperature of the glass is reduced to normal. The cam 107 is shaped to hold the contacts 105 closed a sufficient length of time to permit a complete operation of the electro-magnet.

The adjusting screw 98 provides for an adjustment by which the operator may vary the amount of compression of the spring 88 necessary to close the contacts 95. For example, if it is found that the contacts 95 are brought together before the temperature of the glass is sufficiently reduced to call for an operation of the electro-magnet, the adjusting screw 98 may be operated to separate the contacts 95 more widely, thus requiring a greater compression of the spring 88 to bring said contacts together. A similar adjustment is provided for the contacts 103 so that the temperature at which the electro-magnet 42 is brought into position may be independently controlled. These adjustments also permit the apparatus to be adjusted for different sizes of plungers or to compensate for other variable factors in the operation of the feeder.

It will be observed that the implement which works in the glass (the plunger 27, Fig. 7, or the tube 28, Fig. 1) and determines the operation of the temperature controlling apparatus, is located in close proximity to the outlet for the glass, so that the condition of the glass as it issues controls the temperature regulating mechanism. A more direct temperature control of the charges of glass is thus provided, than if the implement were located at a point more remote from the point of charge formation. It will be understood, however, that under certain conditions, it might be advisable to locate the temperature controlling implement at a point nearer the main furnace. It will also be understood that although I have utilized a part of the feeder which controls the discharge of glass, as the implement to actuate the heat controlling means, the invention is not limited to this particular combination, but many features of the invention might be embodied in a construction in which an implement for controlling the temperature is separate from the mechanism which regulates or controls the flow of glass.

Modifications other than those herein specified may be resorted to within the spirit and scope of my invention.

What I claim is:

1. Means for controlling the temperature of molten glass, comprising a mechanical element in contact with the glass, means for moving said element, and means governed by the resistance of the glass to the movement of said element for controlling the application to the glass of a temperature regulating medium.

2. The combination of a container for molten glass, an implement in contact with the glass, means for driving said implement, and temperature regulating means controlled by the resistance of the glass to the movement therein of said implement.

3. The combination of a container for molten glass, an implement in contact with the glass, mechanism for transmitting motion to said implement, an electro-motor, and means actuated by said mechanism and dependent for its operation on the resistance of the glass to the movement of said implement, to control the motor circuit.

4. The combination of a container for molten glass, an implement in contact with the glass, mechanism for transmitting motion to said implement, an electro-motor, means actuated by said mechanism and dependent for its operation on the resistance of the glass to the movement of said implement, to control the motor circuit, and means actuated by the electro-motor to control the application of a heat regulating medium to the glass.

5. The combination of a container for molten glass, an implement in contact with the glass, a driving element, mechanism for transmitting motion from said driving element to said implement including relatively movable parts, means to yieldingly hold said parts in a predetermined relative position, said parts being moved relatively when a predetermined resistance is offered by the glass to the movement of said implement, an electro-motor, a circuit therefor controlled by said relative movement of said parts, means for supplying a temperature regulating medium for controlling the temperature of the glass, and means actuated by the electro-motor for controlling said medium.

6. The combination of a container for molten glass, an implement in contact with the glass, said container having an outlet through which the glass issues, said implement being arranged to control the flow of glass through the outlet, a driving element, mechanism for transmitting motion from said driving element to said implement including relatively movable parts, means to yieldingly hold said parts in a predetermined relative position, said parts being moved relatively when a predetermined resistance is offered by the glass to the movement of said implement, an electro-motor, a circuit therefor controlled by said relative movement of said parts, means for supplying a temperature regulating medium for controlling the temperature of the glass, and means actuated by the electro-motor for controlling said medium.

7. The combination of a container for molten glass, mechanism for raising the temperature of the glass when it falls below a predetermined working range of temperature, mechanism for reducing the temperature when it rises above said working range, an implement in the glass, a driving element, mechanism for transmitting motion from the driving element to said implement including relatively movable parts yieldingly held in positions determined by the resistance of the glass to the movement therein of said implement, electro-motive means controlling the actuation of said heat increasing and heat reducing mechanisms, and electrical circuits for said electro-motive means controlled by the relative positions of said motion transmitting parts.

8. The combination of a container for molten glass, an implement extending into the glass, a driving element, means for transmitting motion from said element to said implement comprising aligned shafts, a torsion spring connecting said shafts and permitting relative rotation thereof, an electro-motor, and contacts in the motor circuit moved into and out of engagement by relative movement of said shafts.

9. The combination of a container for molten glass, an implement extending into the glass, a driving element, means for transmitting motion from said element to said implement comprising aligned shafts, a torsion spring connecting said shafts and permitting relative rotation thereof, an electro-motor, contacts in the motor circuit moved into and out of engagement by relative movement of said shafts, and means actuated by said electro-motor for controlling the temperature of the glass.

10. The combination of a container for molten glass having a bottom outlet opening, a tube projecting downward into the glass over the outlet, a drive shaft, means for transmitting motion from said drive shaft to said tube comprising relatively movable elements normally held in a predetermined relative position during the rotation of said tube when the glass is at a normal working temperature and moved to a different relative position when the temperature and viscosity of the glass are changed by a change in the temperature of the glass beyond said normal temperature, means for supplying a temperature regulating medium, a valve controlling said supply, an electro-motor for actuating said valve, and means in the motor circuit actuated by said relative movement for controlling the motor circuit.

11. Means for maintaining molten glass at a substantially constant working temperature comprising electro-motors, means actuated by one motor for increasing the temperature of the glass when said motor is brought into activity, and means actuated by the other motor for reducing the temperature of the glass, an implement extending into the glass, a driving element, mechanism for transmitting motion from said driving element to said implement comprising relatively movable parts, the relative positions of said parts being variable in response to variations in the resistance offered by the glass to the movement of said implement, and circuits for said motors controlled by said relatively movable parts for actuating the motor controlling the increase of temperature when the temperature falls below normal and for actuating the other motor when the temperature rises above normal.

12. The combination of means for discharging and periodically severing mold charges from a supply body of molten glass, and automatic means for causing a variation in the temperature of the glass corresponding to variations in the time intervals between successive severing operations.

13. The combination of a container for molten glass having a discharge outlet through which the glass issues, means for periodically severing the issued glass, and means for automatically increasing the temperature of the supply body of glass when the time interval between successive severing operations is reduced and for decreasing the temperature of the glass when said time interval is increased.

14. The combination of a container for molten glass having a discharge outlet through which the glass issues, shear mechanism operated periodically to sever charges of glass, a movable mold carriage, molds thereon brought into charge receiving position in synchronism with the operations of the cutting mechanism, and automatic means to increase the rate of glass discharge when the time intervals between successive operations of the shears are reduced and thereby maintain substantially uniform size of charges.

15. The combination of a container for molten glass having a discharge outlet, a mold carriage, molds thereon brought successively into charge receiving position, shears operated periodically in synchronism with the movements of the molds to said position, an implement in contact with the glass in the container, means for driving said implement at a speed proportionate to that of the mold carriage, and automatic means controlled by said implement for increasing or decreasing the temperature of the glass in the container in response to an increase or decrease of the speed of said implement and mold carriage.

16. The method of regulating the temperature of molten glass which comprises moving a mechanical element through the glass and causing the resistance of the glass to the movement of said element to react through the driving means and thereby effect the operation of temperature controlling mechanism.

17. The method of maintaining a body of molten glass at a substantially uniform temperature which comprises applying a temperature regulating medium to the glass, moving a mechanical element in the glass, and causing the resistance offered by the glass to the movement of said element to vary the supply of said temperature regulating medium in response to variations in said resistance.

18. The combination of a container for molten glass having an outlet through which the glass is discharged, an implement controlling the rate of discharge, a driver for actuating said implement, yielding means interposed between said implement and driver whereby their relative position is determined by the resistance of the glass to the movement of the implement therein, and means controlled by said relative position to control the application to the glass of a heat regulating medium.

19. The combination of a container for molten glass, an implement, means for moving the implement within the glass and thereby causing it to control the discharge of glass from the container, and means controlled by the resistance of the glass to the movement of the implement therein for controlling the temperature of the glass.

20. The combination of a container for molten glass, mechanism for effecting a regulated discharge of glass therefrom, including an implement working in the glass and means for periodically severing charges of glass of a predetermined volume, means for moving said implement, and automatic means controlled by the resistance of the glass to the movement of said implement to vary the rate of discharge of glass to correspond with variations in the speed of operation of said mechanism.

Signed at Toledo, in the county of Lucas and State of Ohio, this 11th day of April, 1927.

JOHN F. RULE.